United States Patent [19]

Hayes

[11] 3,904,866
[45] Sept. 9, 1975

[54] TRANSLUCENT STRUCTURAL PANELS

[76] Inventor: Dorothy E. Hayes, 30 E. 4th St., New York, N.Y. 10003

[22] Filed: Oct. 29, 1974

[21] Appl. No.: 519,021

[52] U.S. Cl............... 240/10 L; 240/1 LP; 350/259
[51] Int. Cl.² ...................................... A47G 33/16
[58] Field of Search......... 240/10 L, 1 LP; 350/259, 350/260, 261

[56] References Cited
UNITED STATES PATENTS
2,844,998   7/1958   Vincent .......................... 350/261 X
3,437,405   4/1969   Northrop ..................... 240/1 LP X Primary Examiner—Monroe H. Hayes

[57] ABSTRACT

A three-dimensional architectural panel formed by a shallow transparent box within which transparent rods and other discrete optical element are encapsulated. The optical elements are deployed in layers which are compressed and held in place between the faces of the box to create abstract sculptural forms that interact with incident light to produce distinctive luminous patterns that have aesthetic appeal, the optical element also functioning to scatter light, thereby preventing viewing through the panel and ensuring privacy.

7 Claims, 20 Drawing Figures

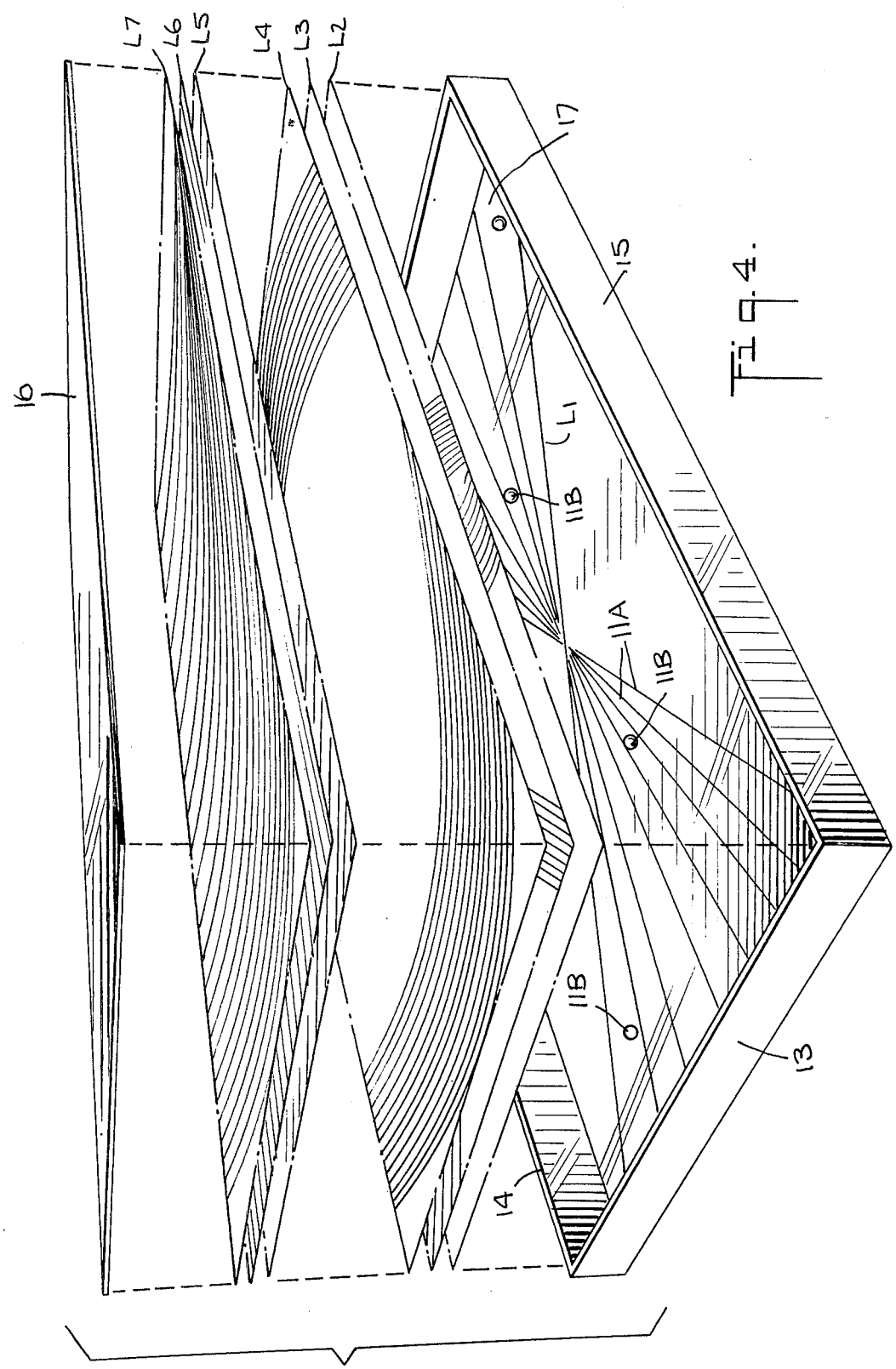

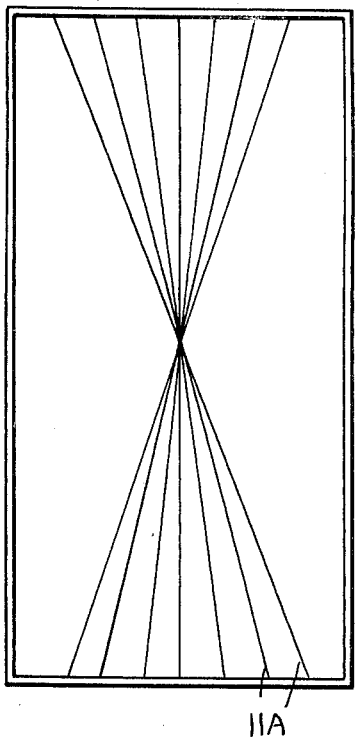
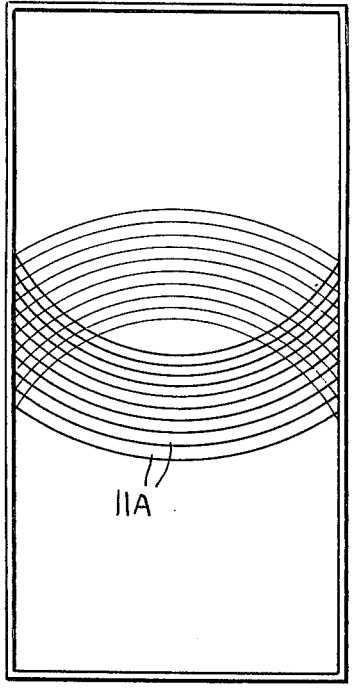
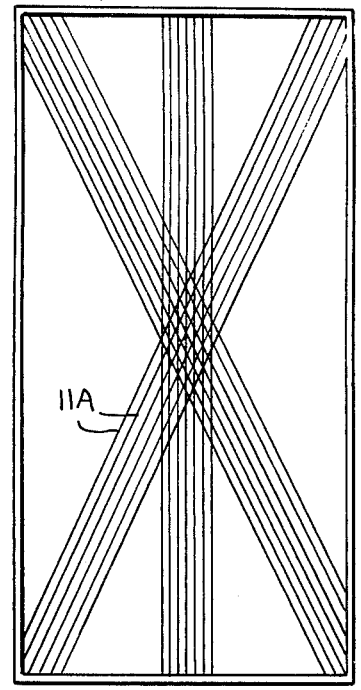
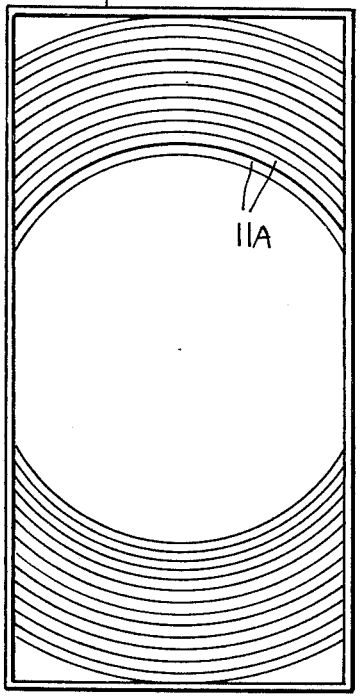
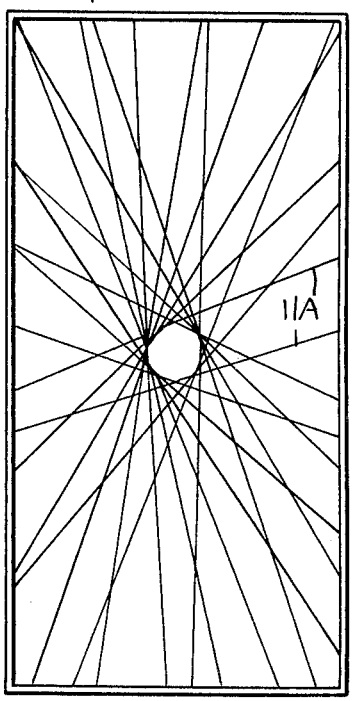
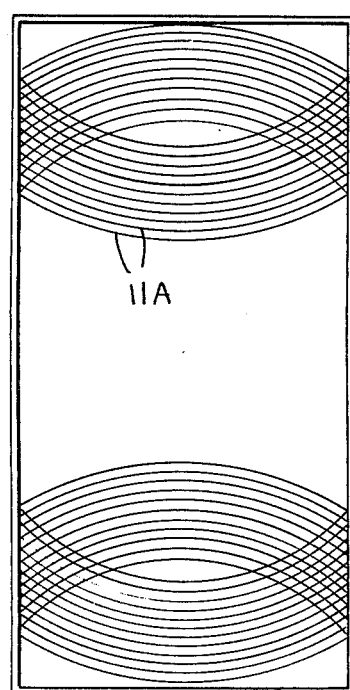

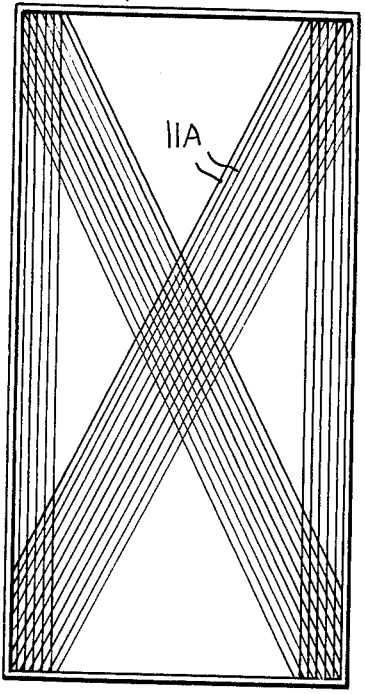
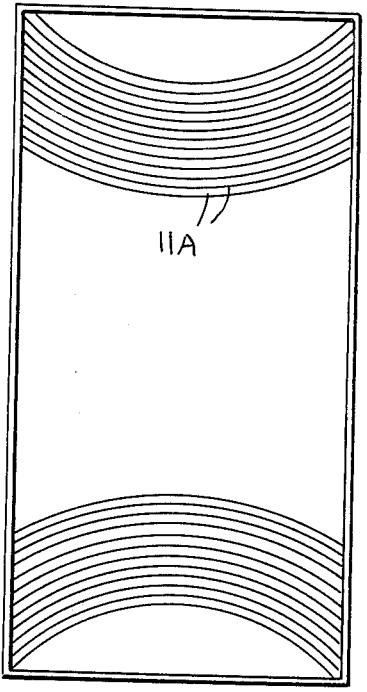
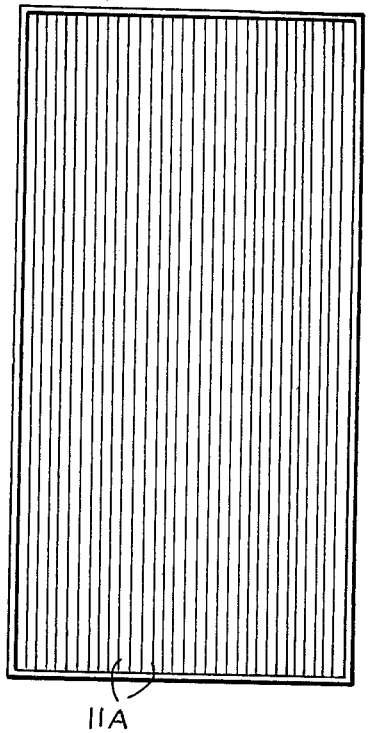
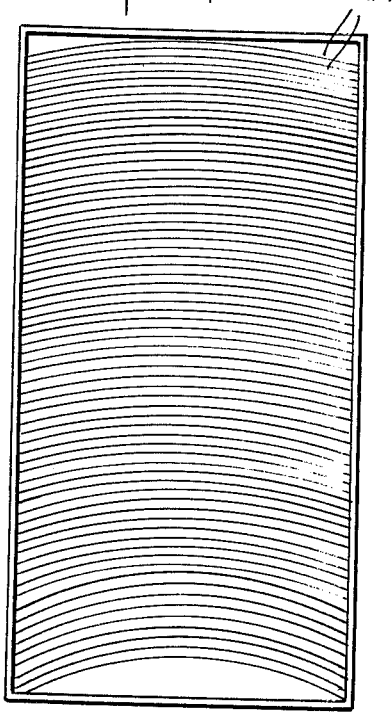
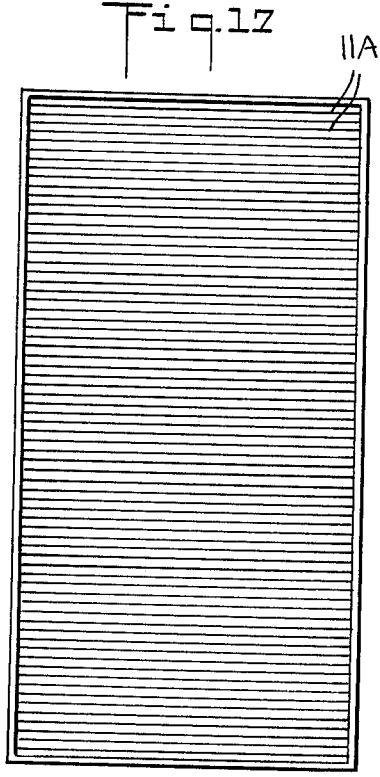
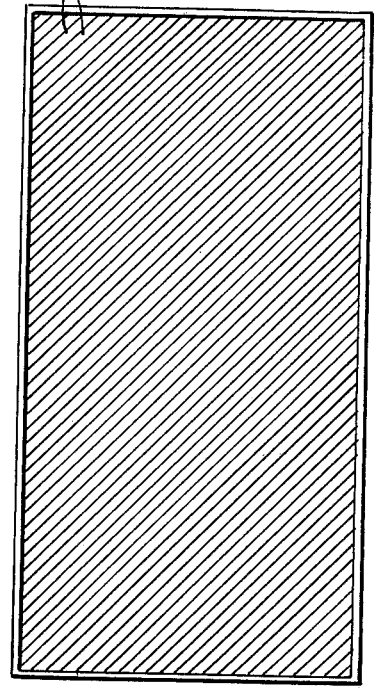

TRANSLUCENT STRUCTURAL PANELS

BACKGROUND OF THE INVENTION

This invention relates generally to architectural panels or partitions, and more particularly to three-dimensional panels or partitions formed by shallow transparent boxes within which transparent rods and other optical elements are encapsulated.

The panel or partition is a basic element of interior architectural design in that it serves to sub-divide an open area into distinct alcoves, enclosures or chambers, making it possible to break the area into separate zones. The usual partition is formed of wood, metal or other opaque material and therefore acts as a light barrier. In many instances it is desirable to provide a panel which is translucent so that the panel does not block light and the enclosure defined thereby does not appear to be cut off from the surrounding area.

The psychological impact of opaque panels is distinctly at variance with those fabricated of translucent material, for the former produces a closed-in or claustrophobic effect, particularly if the enclosure formed by opaque panels is small and confining. For example a narrow work space created by opaque panels usually induces in the occupants thereof the feeling of imprisonment. On the other hand, in the same work space created by panels fabricated of clear glass or plastic sheeting, though one may not feel imprisoned or hemmed-in, one experiences a lack of privacy that may be objectionable.

An obvious compromise between opaque and transparent panels is a panel which optically diffuses light, such as a panel made of ground glass, pebbled plastic sheeting or other translucent material which inhibits viewing through the panel and thereby ensures privacy without blocking the passage of light. But such translucent panels have limited aesthetic appeal and are generally dull and uninteresting from the architectural standpoint.

SUMMARY OF INVENTION

In view of the foregoing, the main object of this invention is to provide a three-dimensional architectural panel whose translucency is achieved by an abstract sculptural design formed by optical elements encapsulated within a transparent box.

More particularly it is an object of this invention to provide a panel of the above-type wherein transparent rods and other discrete optical elements are deployed in layers within a shallow transparent box and are compressed between the faces thereof to create an abstract sculptural form that interacts with light incident to the box to produce distinctive luminous patterns that have aesthetic appeal.

A significant feature of the invention is that the optical elements not only serve to produce a three-dimensional abstract form that is pleasing to the viewer, but the elements which are fabricated of clear plastic material, also function to scatter light and thereby prevent viewing through the panel whereby the panel acts as a partition which ensures privacy.

Also an object of the invention is to provide a panel of the above-type in which the optical elements are mainly constituted by light conducting, bendable plastic rods whose extremities lie adjacent to the sides and ends of the box, whereby light incident to these sides and ends are conducted by the rods to brighten the interior of the panel.

A salient aspect of the panel in accordance with the invention is that the bendable rods encapsulated within the shallow box are held therein by lateral pressure without the use of cement or any bonding agent that would otherwise impair the optical characteristics of the panel.

Another object of this invention is to provide a panel of the above-type which lends itself to creative design whereby no two panels need be identical and a series of abutting panels produces a wall having a high order of aesthetic appeal.

Yet another object of this invention is to provide a simple, low cost technique for assembling panels having rods encapsulated therein.

Briefly stated, these objects are attained in a panel comprising a shallow box parallelepiped parallelspiped configuration formed by transparent plastic material, the box encapsulating a plurality of stacked layers each of which is constituted by bendable rods of clear plastic material arranged in a predetermined decorative pattern. The layers are compressed and held in place between the faces of the box whereby a three-dimensional abstract form is produced that is the resultant of the multiple layers. The extremities of the rods lie adjacent to the ends and sides of the box to intercept the light incident thereto and to conduct it through the rods, thereby illuminating the abstract form.

OUTLINE OF THE DRAWING

FIG. 4 is an exploded view of the panel components;

Figure 19:
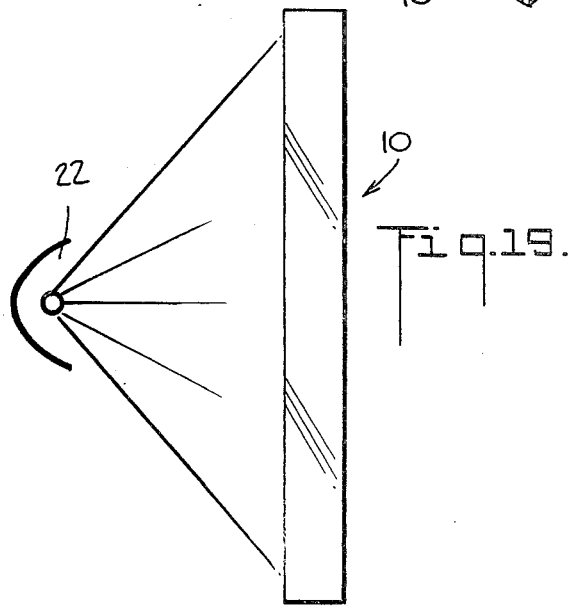
Figure 20:
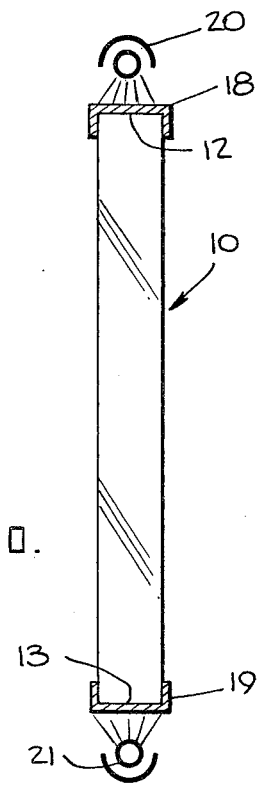

FIG. 7 through 18 each illustrates in plan view a layer of elements that may be enclosed in a panel in accordance with the invention, each layer having a distinctive pattern;

FIG. 19 shows one form of panel illumination in which the rays impinge on one face of the panel; and FIG. 20 shows an edge-lighting arrangement for the panel.

DESCRIPTION OF THE INVENTION

Referring now to FIGS. 1 to 5, there is shown a three-dimensional panel or partition member in accordance with the invention, the panel being constituted by a shallow box of transparent material, generally designated by numeral 10, within which discrete optical elements are encapsulated, these elements being generally designated by numeral 11.

The box has a parallelepiped formation and is composed of two short ends 12 and 13, two long sides 14 and 15, a front face 16 and a rear face 17. The box and all of the optical elements encapsulated therein are fabricated of transparent material, preferably in the form of clear acrylic resin, sheeting of the type which is commercially available under the trademarks "Plexiglas" or "Lucite". The ends, sides and faces of the box are marginally attached to each other by a suitable cement or bonding agent. But as will later be explained, the discrete elements 11 encapsulated within the box are held therein by lateral pressure or entrapment without the use of adhesive or other bonding means that might impair or modify the optical characteristics of these elements.

Figure 1:
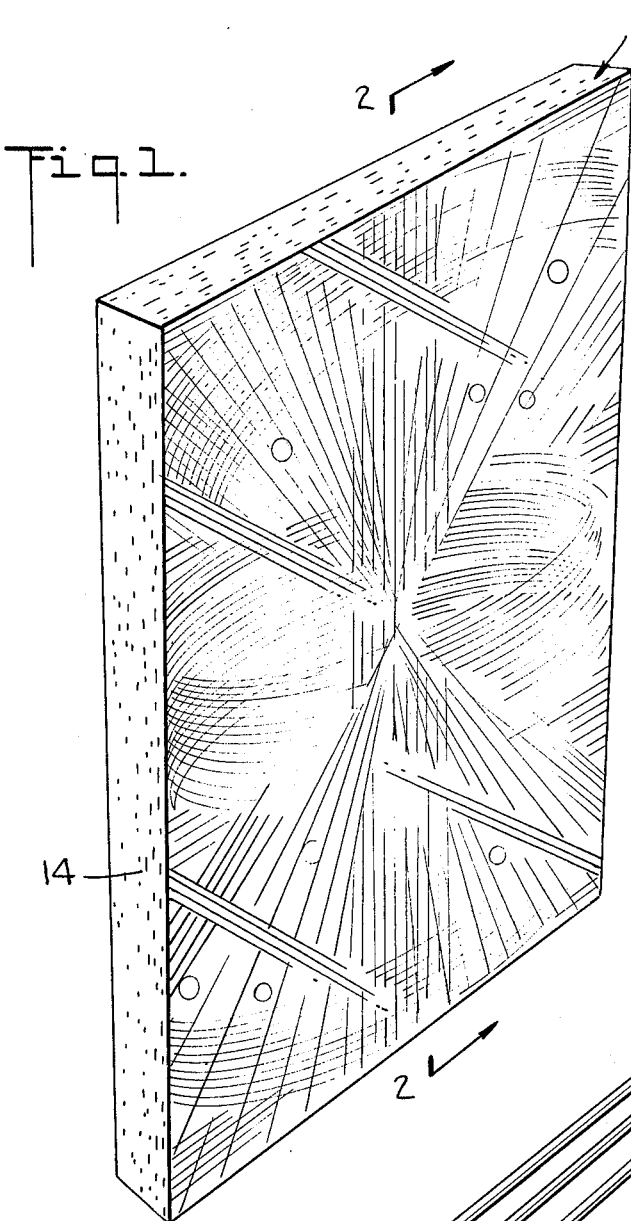
FIG. 1 is a perspective view of one preferred embodiment of an architectural panel in accordance with the invention.
Figure 2:
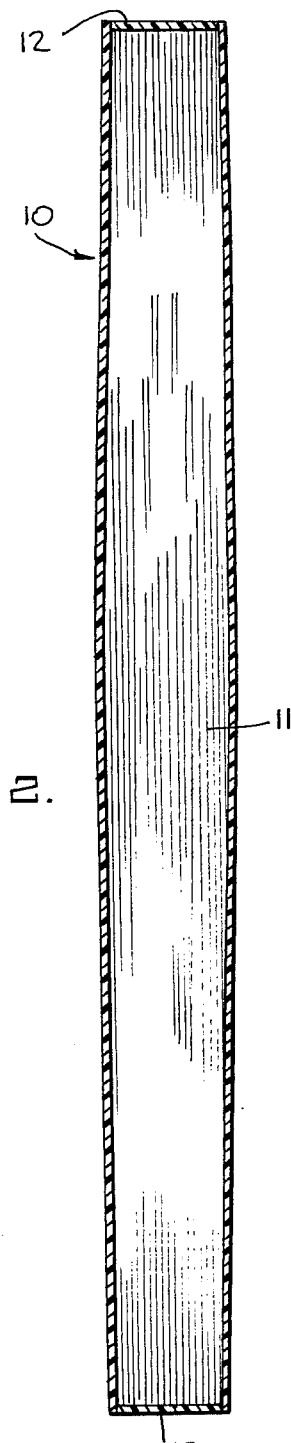
FIG. 2 is a longitudinal section of the panel taken in the plane indicated by line 2—2 in FIG. 1.
Figure 3:
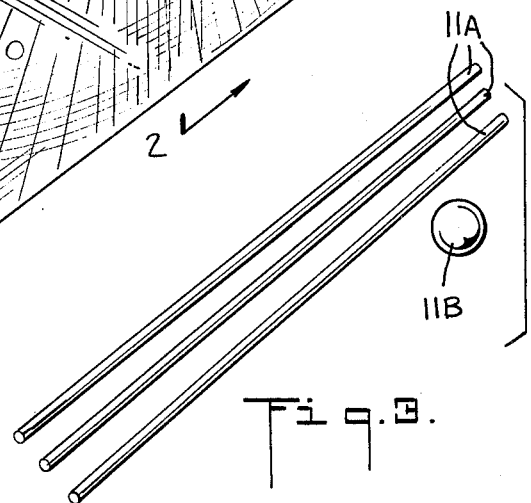
FIG. 3 shows some of the optical elements encapsulated in the panel illustrated in FIG. 1.
Figure 5:
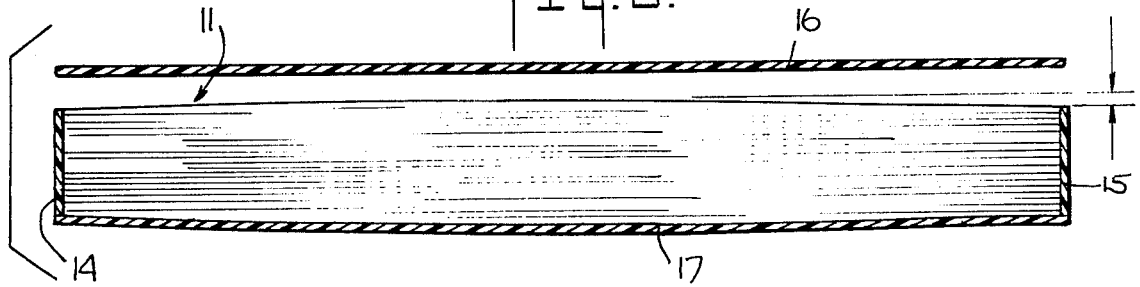
FIG. 5 is a transverse section of the panel, with the top face raised.

The discrete optical elements 11, as shown in FIG. 3, are mainly composed of solid flexible rods 11A having a circular cross section, and balls 11B. The rods are formed of flexible acrylic material which is bendable to assume a desired configuration within the box. The balls or beads may be of clear acrylic or glass. In practice, rough, natural gem stones or other reflective elements may be added to the aggregation of optical elements.

Rods 11A optically behave in the manner of solid glass fibers or cylindrical light pipes that are capable of transmitting light from one end thereof to the other without leakage, provided that light rays admitted into the one end thereafter strikes the wall of the pipe with an angle of incidence greater than the critical angle for total internal reflection. In transmission, light travels along the cylinder in a zig zag path of successive reflections. If the light-transmitting cylinder is bent in a moderate curve, a certain amount of lateral light leakage will be experienced, but the major portion of light will be confined within the cylinder. It is for this reason that curved light pipes may be used to conduct light from one location to another in curved paths. On the other hand, light impinging laterally on the rods will, in part, be reflected and scattered, though some rays may also be transmitted. Balls 11B act as light dispersing elements. While not shown, small prismatic elements of acrylic may also be included in the aggregation to create rainbow effects.

Figure 6:
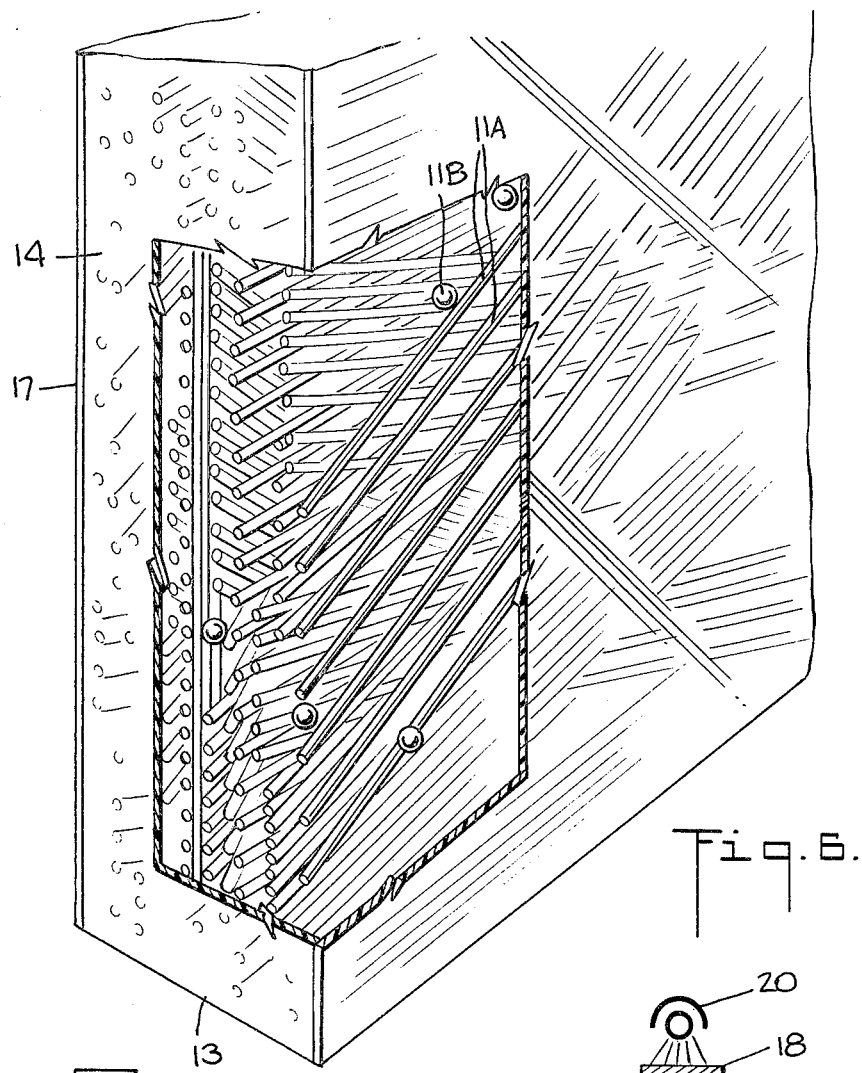
FIG. 6 is a perspective view of one corner of the panel, with the box cut away to expose the elements encapsulated therein.

As best seen in FIG. 6, rods 11A are so arranged within the box that their extremities lie adjacent the ends and sides of the box whereas balls 11B are randomly distributed within the box. In mounting the panel, the panel is preferably slid into upper and lower channel-shaped mounting fixtures 18 and 19, as shown in FIG. 20, which are formed of transparent plastic material so as to be light permeable. Hence by installing suitable light sources 20 and 21 behind the fixtures, one may thereby exploit the light transmission characteristics of the rods and illuminate the entire panel interior from concealed external source. In practice the panels may be suspended from a ceiling or otherwise supported.

Light impinging laterally on the pane from an external source 22, as shown in FIG. 11, or from natural light in the room in which the panel is installed, will be intercepted by both the encapsulated rods and the balls will be scattered, diffracted and dispersed thereby so that the resultant light patterns will be multi-colored and complex. Though the box is made of clear material, the panel constituted by the box and the encapsulated optical elements is not transparent but translucent. Because of the diverse optical phenomena produced by the optical elements, images cannot be viewed through the panel and privacy is preserved.

The overall configuration of the rods, balls and other optical elements within the box creates an abstract sculptural form which is aesthetically pleasing, even in the absence of artificial illumination. This configuration is determined by the selective manner in which the rods are deployed or arranged within the box.

As shown in FIG. 4, the optical elements are stacked within the box in the form of planar layers, one above the other. Thus the bottom layer $L_1$ is composed of a cluster of rods 11A in an intersecting pattern, with the ends of most rods lying adjacent the ends 12 and 13 of the box, some of the rod ends being adjacent the box sides. Placed between some of these rods are balls 11B which though loose, are ultimately trapped when the panel is assembled and erected.

In a panel assembly operation, the open box is placed in a horizontal position with the top face omitted, and after each layer is assembled and laid down in the box the next layer is formed thereover. Thus in the arrangement shown, placed over the bottom layer $L_1$ are a series of layers $L_2$, $L_3$, $L_4$, $L_5$, $L_6$, and $L_7$, each having a distinctive pattern of rods which may further include balls and other discrete optical elements.

The number of layers and the thickness of each layer is so related to the depth of the open box that the final layer bulges slightly above the rim of the box. But since the layers are formed of resilient plastic material, they are somewhat compressible. When all layers are assembled, the top face 16 is brought down thereover to seal the box. Pressure is applied to the top face with sufficient force to compress and confine all layers within the box, at which point the top face is securely bonded to the ends and sides of the box, after which the pressure is released. Hence all of the rods are held within the box by a compressive force which maintains the predetermined rod patterns.

In FIGS. 7 to 18, there are illustrated various examples of possible rod patterns. Because of the multi-layer arrangement, the patterns of the various layers placed in the box commingle with each other when viewed through the faces to create a complex, three-dimensional abstract sculptural form. This form interacts with incident light to produce a highly subtle, illuminated design which because of light scattering and dispersion effects is multi-colored and glittering. This design appears to change as the angle at which the design is viewed, is varied.

FIG. 7 shows one example of a layer, and it will be seen that rods 11A in this instance are in a multiple X-formation. In FIG. 8 the rods are assembled into two intersecting arcuate arrays, while in FIG. 9 the multiple X-formation is combined with a group of vertical rods which pass through the points of intersection.

In FIG. 10, the rod formation of the layer is constituted by an upper set of arcs and a lower set of arcs which together define incomplete concentric circles, while in FIG. 11 the rods are deployed to produce a star-like effect. In FIG. 12, the arrangement is such as to provide an upper set of intersecting arcuate rods and a matching lower set thereof. In FIG. 13, the multiple-X rod formation is combined with a parallel cluster of vertical rods adjacent the sides of the box. In FIG. 14, two sets of opposing arc clusters are provided, while FIG. 15 shows a uniform array of vertical rods.

In FIG. 16 the curved rods extend transversely, the radius of curvature being progressively increased from the bottom to the top of the box. In FIG. 17 the rods are all straight and extend transversely, whereas in FIG. 18 the straight rods all lie at the same angle in the array thereof.

It will be evident from FIGS. 7 to 18 that the range of geometrical possibilities for the symmetrical and asymmetrical deployment of rods in each layer within the box is very broad, and that those designs shown are only a sampling. It will also be recognized that the designer, when creating a panel, must consider the interplay of the several layers, for the ultimate design and its expressive content is the optical and structural resultant of the layers which fill the volume of the box.

Also while one may compose all layers of transparent elements, some of the rod elements or balls may be of pigmented plastic material to lend further interest to the design. It is also to be understood that in practice one may make panels of different height and width, and that a series of abutting panels may be set up to create a wall. In some instances it may be desirable to interpose a translucent panel in accordance with the invention in a wall otherwise composed of conventional opaque panels in order to relieve the wall of its opaque characteristics.

While there has been shown and described preferred embodiments in accordance with the invention, it will be appreciated that many changes and modifications may be made therein without, however, departing from the essential spirit thereof. Thus the rear face of the shallow box, instead of being formed of clear plastic material may be silvered to provide a relfecting mirror which enhances thelight effects produced by the irradiated rods encapsulated in the box.

What is claimed is:

1. An architectural panel comprising:
    A. a sealed shallow box of parallelepiped shape and predetermined depth formed by a pair of sides, a pair of ends and top and bottom faces secured to the ends and sides, said box being fabricated of transparent material, and
    B. discrete optical elements encapsulated within said box, said elements being composed mainly of rods of transparent material whose ends lie adjacent the sides of the box to intercept light incident thereto, said rods being deployed in said box in the form of compressible stacked layers, each constituted by a planar assembly of rods in a predetermined pattern which is different from the patterns of the other layers, the overall thickness of the stacked layers being slightly greater than the depth of said box, said layers being sandwiched and compressed by said faces to hold said layers in place.

2. A panel as set forth in claim 1, wherein said box and said rods are fabricated of acrylic material.

3. A panel as set forth in claim 1, wherein said element includes balls of clear material.

4. A panel as set forth in claim 1, wherein said element includes prisms of clear material.

5. A panel as set forth in claim 1 wherein said rods are formed of bendable material, some of said rods being bent to provide arcs.

6. A panel as set forth in claim 1 in combination with light means adjacent the sides of the box to irradiate the ends of the rods.

7. A panel as set forth in claim 1 in combination with a channel-shaped fixture in which the ends of said panel are slideable.

* * * * *